Patented Dec. 1, 1942

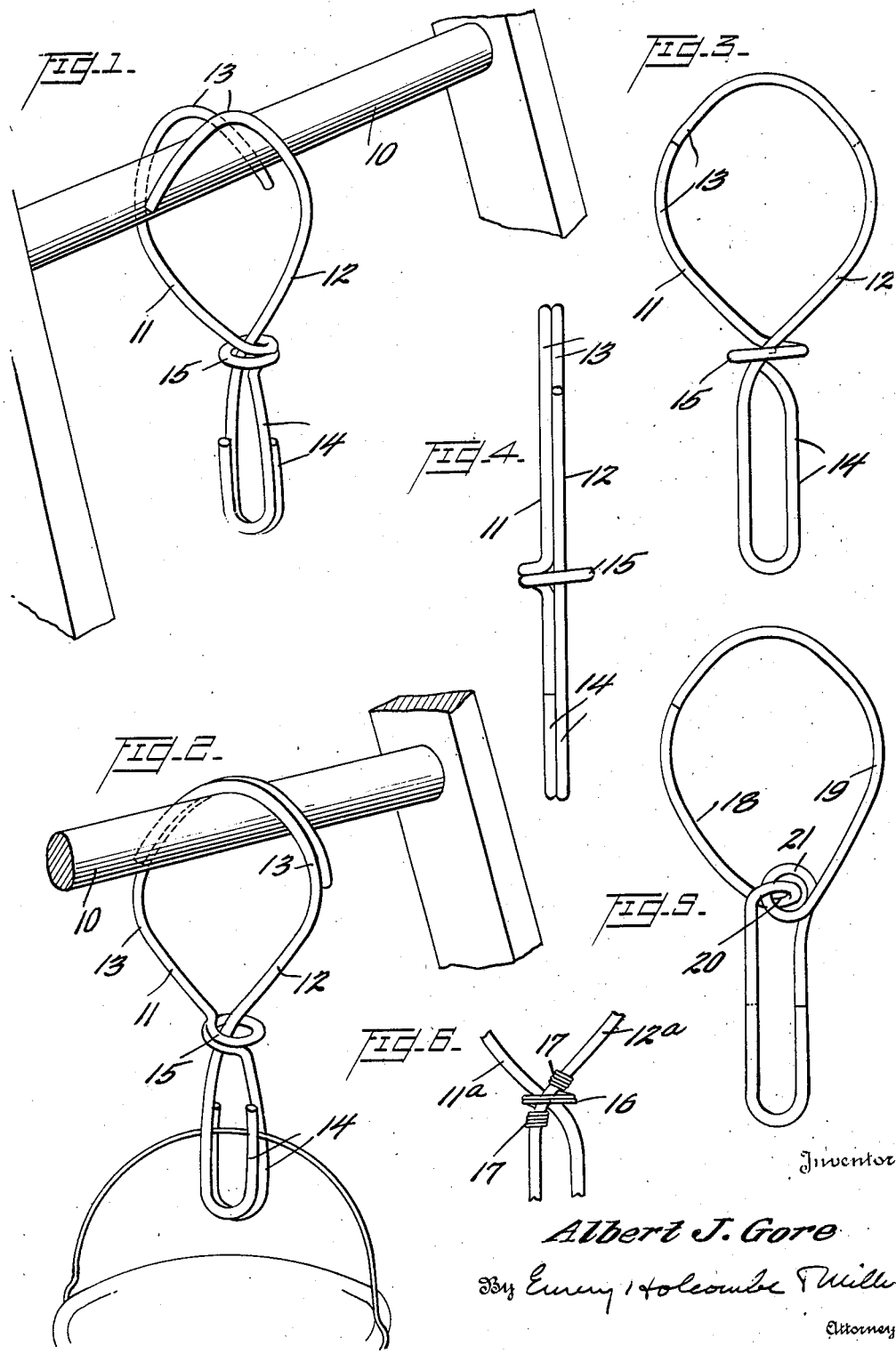

2,303,993

UNITED STATES PATENT OFFICE 2,303,993

UTENSIL SUPPORTING HOOK

Albert J. Gore, Washington, D. C.

Application July 2, 1942, Serial No. 449,493

7 Claims. (Cl. 24—236)

This invention relates to supporting means for pails, baskets, rope sheaves, slings, cable supports and other utensils used by painters, window washers, riggers, fruit pickers, firemen, electric linemen and all those whose work requires the use of ladders, poles and scaffolds, and for connecting lines, harness races and similar members.

The invention aims to provide a light, secure and easily manipulated hook having sufficient strength for the purpose in hand and readily adapted to manifold uses.

Further objects of the invention appear in the following description.

The invention consists of two double ended hooks oppositely disposed and loosely connected where they cross intermediate their hooked ends, each preferably having one large and one small end hook, as shown in the accompanying drawing illustrating a pail hook and its manner of use.

In the drawing,

Fig. 1 is a perspective view showing the operation of engaging the larger hooks over a rung of a ladder;

Fig. 2 is a similar view showing the hook engaged with its larger hooks over the rung of the ladder and the bail of a pail being engaged in the smaller hooks;

Fig. 3 is a face view of a hook assembly showing the hooks in their locked position;

Fig. 4 is an edge view of the same;

Fig. 5 is a face view of another form of hook embodying the invention, showing it in its normal unlocked position; and Fig. 6 is a face view of a modified form of loose joint for the two hook members.

Referring to Figs. 1 to 4, inclusive, the implement therein illustrated consists of two S-shaped hook members 11, 12, formed from steel wire or other suitable stiff springy and resilient material, each of which has one large hook-shaped end 13 and one smaller hook-shaped end 14, the two being loosely connected intermediate their hook-shaped ends by a loop or ring 15 formed in the stem portion of one of the members 11 and encircling the adjacent stem portion of the other member 12.

Instead of an integral loop for loosely connecting the stems of the two hook members, a separate coil of smaller wire 16 may be loosely encircled around the stem of one of the members 11ª, as shown in Fig. 6, with its ends 17 tightly twisted around the stem of the other member 12ª, and either welded or soldered in place.

The hook members 11, 12 may be connected both by an integral loop 15 as shown in Figs. 1 to 4, the contiguous portions of which loop may advantageously be soldered together, and by a separate coil 16 as shown in Fig. 6, thereby preventing them from being accidentally disassembled in use, although such supplemental connecting means is not essential to the security and convenient use of the device.

Instead of S-shaped hook members, E-shaped members 18, 19, as shown in Fig. 5 may be assembled in overlapping relationship with their open sides oppositely disposed, and loosely connected by an open loop 20 on one member engaging in a ring 21 formed in the other member, the loop and ring being disposed in planes at right angles to each other.

In using the implement, the larger hook-shaped ends are advantageously engaged over a supporting member, as for example, the rung 10 of a ladder, by resiliently separating them at right angles or transversely to the central plane of the implement sufficiently to slip them past the rung, one on each side thereof, as shown in Fig. 1, until the two ends have cleared the support, and then turning them through 90° to engage their ends over the support and permit them to drop into hooked position, as shown in Fig. 2, the lower hooks being reversed front to back to lock the hook in place if desired.

The supported article or device, as the bail of a pail for example, is engaged in the smaller hooked ends of the implement in similar manner, the first step of separating the two ends transversely and slipping the supported articles between them being illustrated in Fig. 2, the pivot connection being sufficiently loose to permit this, followed by turning the bail at right angles to the plane of the hooks and dropping it into place, thereby securely locking the implement.

The relative lengths of the larger and smaller hooked end portions of the S-shaped loop members may be made to suit the purposes for which the implement is intended to be used. For supporting a pail having a small bail from the rung of a ladder having a considerably larger diameter than the bail, the loose connection may be positioned at from ¼ to ⅔ the overall length of the implement, measuring from the smaller end. For supporting articles of approximately the same size as the supporting member, the loose connection is preferably positioned midway between the ends.

The implement is particularly well adapted to supporting articles from moving or movable supports from which an ordinary S-shaped hook would be likely to be dislodged, and for use in the wind or under other conditions likely to disengage ordinary hooks from their supports. It is likewise well adapted for supporting articles subject to erratic movements likely to disengage them from the device and from the support, for which snap hooks are frequently employed. It has the advantage over ordinary snap hooks that either end may be disconnected.

Many uses for the invention will occur to those skilled in the arts and it is not restricted to the exact forms and uses described.

What I claim and desire to secure by Letters Patent is as follows:

1. An improved hook consisting of two similar double-ended hook members disposed side by side in substantially parallel planes and in opposed hooking relation and loosely connected where their respective stems cross by an encircling loop.

2. An improved hook consisting of two similar double-ended hook members of S-form disposed side by side in opposed hooking relation and loosely connected where their respective stems cross by an encircling loop formed integral with one of said members.

3. An improved hook consisting of two similar S-shaped double-ended hook members disposed side by side in opposed hooking relation and loosely connected where their respective stems cross by an encircling loop, the point of crossing being nearer one end than the other of said S-shaped members.

4. An improved hook consisting of two similar S-shaped double-ended hook members disposed side by side in opposed hooking relation and loosely connected where their respective stems cross by an encircling loop formed of a small coil the ends of which tightly embrace one of said S-shaped members.

5. An improved hook consisting of two similar double-ended hook members disposed side by side in opposed hooking relation and loosely connected where their respective stems cross by an encircling loop formed in the stem of one member engaging in a ring formed integral with the stem of the other member.

6. An improved hook consisting of two similar double-ended hook members of S-form disposed side by side in substantially parallel planes and in opposed hooking relation and loosely connected where their respective stems cross by an encircling loop formed in the stem of one member engaging in a ring disposed at right angles thereto and rigidly connected to the other member.

7. An improved hook consisting of two similar double-ended hook members disposed in juxtaposition in opposed hooking relation with their stems crossing and loosely connected where their stems cross as by an encircling loop permitting movement laterally and transversely with respect to the principal axes of said hook members when in normal position.

ALBERT J. GORE.